United States Patent
Raj

[19]

[11] Patent Number: 6,108,130
[45] Date of Patent: Aug. 22, 2000

[54] STEREOSCOPIC IMAGE SENSOR

[75] Inventor: Kannan Raj, Chandler, Ariz.

[73] Assignee: Intel Corporation, Santa Clara, Calif.

[21] Appl. No.: 09/393,757

[22] Filed: Sep. 10, 1999

[51] Int. Cl.[7] .................................................. G02B 27/22
[52] U.S. Cl. ....................... 359/462; 359/464; 359/466; 359/472; 359/473; 352/57; 352/60; 352/61; 348/54; 348/42; 600/111
[58] Field of Search ..................... 359/462, 463, 359/464, 466, 472, 473; 352/57, 58, 59, 60, 61; 348/54, 55, 56, 57, 42; 600/101, 111

[56] References Cited

U.S. PATENT DOCUMENTS

| | | | |
|---|---|---|---|
| 5,191,203 | 3/1993 | McKinley | 250/208.1 |
| 5,751,341 | 5/1998 | Chaleki | 348/65 |
| 5,790,284 | 8/1998 | Taniguchi | 359/15 |
| 5,835,133 | 11/1998 | Moreton | 348/49 |
| 5,896,225 | 4/1999 | Chikazawa | 359/463 |

*Primary Examiner*—Cassandra Spyrou
*Assistant Examiner*—Leo Boutsikaris
*Attorney, Agent, or Firm*—Trop, Pruner & Hu, P.C.

[57] ABSTRACT

A stereoscopic image sensor may be formed of a single image sensor having a pair of fields formed therein. The fields may be closer to one another than are a pair of left and right image collectors. The close spacing may be achieved by using an image redirector to redirect image information from the spaced apart collectors to the less spaced apart fields on the image sensor. In some embodiments of the present invention, by using a single imaging sensor, a more compact structure may be achieved which may be of lower cost and may enjoy reduced processing complexity. In addition, because a single sensor is utilized, in some embodiments of the present invention, the left and right images may be captured essentially identically.

22 Claims, 2 Drawing Sheets

STEREOSCOPIC IMAGE SENSOR

BACKGROUND

This invention relates generally to capturing stereoscopic images for three dimensional display.

The human eyes are essentially stereoscopic image collectors. Because the left and right eyes are spaced apart, they each capture information from which information about the depth of an object being viewed can be determined. With depth information the human eye can view objects in three dimensions. The eye judges how objects relate to one another spatially when viewed from different positions.

Manmade systems may use similar principles to record stereoscopic image pairs. For example, a pair of image sensors may be spaced apart from one another sufficiently so that each sensor records an image from a different position. The recorded images may be digitally captured, for example in a complementary metal oxide semiconductor (CMOS) imaging array. Those captured images may then be arranged for stereoscopic viewing. Techniques for stereoscopic viewing may involve using left and right filters to reconstruct the depth dimension recorded via the stereoscopic image pairs. The image information may be reconstructed using left and right color filters which decode left and right color coding from the composite stereoscopic image. Alternatively, left and right polarizers may do the same thing by decoding encoded polarization information to separate the left and right stereoscopic pairs from a composite image.

Conventional systems use two sensors, one for capturing the left image and another for capturing the right image, to create a three dimensional composite image. Using two sensors may result in increased cost and increased electronic processing of the captured images. The information from the two sensors is generally separately processed for subsequent recombination and stereoscopic viewing. Moreover, because of the separation between the two image sensors, the compactness of the resulting sensing system suffers.

Thus, there is a continuing need for better devices and techniques for stereoscopic image sensing.

SUMMARY

In accordance with one aspect, a stereoscopic image sensor includes an imaging array including a left and right imaging array field. A stereoscopic lens system includes left and right image collectors. The image collectors are spaced further apart than the left and right imaging array fields.

Other aspects are set forth in the accompanying detailed description and claims.

DETAILED DESCRIPTION

Figure 1:
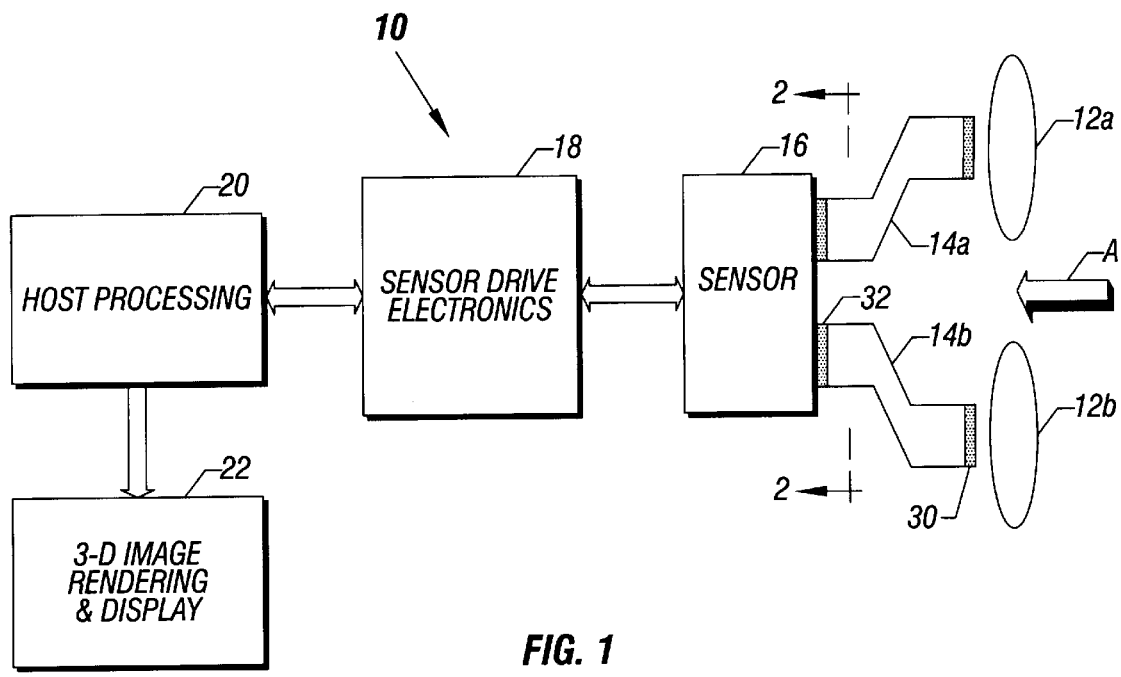
FIG. 1 is a block diagram of one embodiment of the present invention.

A stereoscopic image sensing system 10, shown in FIG. 1, includes a collecting system 12 made up of a pair of left and right image collectors 12a and 12b. The scene reflectance, indicated by the arrow A, is picked up by the spaced apart image collectors 12a and 12b. Because of their spaced apart orientation, the collectors 12a and 12b have different points of view which can be used to recreate depth information for stereoscopic or three dimensional viewing of the resulting image information.

The image information collected by the collectors 12a and 12b may be redirected to a pair of imaging array fields 16a and 16b of an image sensor 16. The image sensor 16 may conventionally be a complementary metal oxide semiconductor (CMOS) image sensor having a plurality of pixels formed as integrated circuit elements. Alternatively, a charge coupled device (CCD) sensor may be utilized. Advantageously the sensor is formed in a single integrated circuit die.

The image information collected by the collectors 12a and 12b may be forwarded to the imaging array fields 16a and 16b by the image redirecting system 14 including a left element 14a and a right element 14b. The imaging array fields 16a and 16b are more closely situated with respect to one another than the collectors 12a and 12b. The image information is redirected by the system 14 in order for that image information to be captured by the sensor 16.

In this way, the desired spatially separated point of view may be achieved through the collectors 12a and 12b without requiring that the array fields 16a, 16b be similarly spatially displaced. As a result, a single sensor 16 may be used to record both the left and right image information. This may result in a sensing system which is more compact and which processes image information in a more simplified way than is possible in a system using separate left and right image sensors.

The image information captured for the left and right collected fields may be transferred by sensor drive electronics 18 to a host processing system 20. Three dimensional image rendering and display device 22 may be responsible for forming the composite image, using known techniques.

Figure 2:
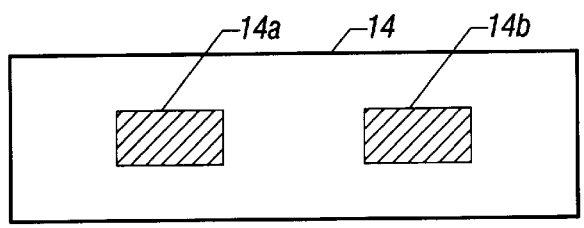
FIG. 2 is a cross-sectional view taken generally along the line 2—2 in FIG. 1.

The image redirecting system 14 may be implemented in a variety of different fashions. As illustrated in FIG. 1, the redirectors 14a and 14b may be substantially rectangularly shaped fiber optic bundles. As depicted in FIG. 2, each redirector 14a and 14b may be rectangularly shaped in cross-section so as to take the image information received by the collectors 12a and 12b and transfer it in a position that is consistent with the rectangular arrays commonly utilized in image sensors. Thus, each redirector 14a or 14b may have a cross-sectional shape which matches the shape of the underlying imaging array field 16a and 16b, in one embodiment of the present invention.

Each redirector 14a and 14b may be made up of a plurality of optical fibers covered by a core cladding. Such systems are commonly called fiber bundles. A large number of fiber optic strands, on the order of thousands of strands for example, may be collected together and each strand may convey a portion of the overall image information intended to be captured. The information received on the input end 30 of each redirector 14a or 14b may be transferred with relatively low losses to the output end 32 which may be situated either directly over, or in contact with, an underlying imaging array field 16a or 16b of the sensor 16.

A variety of schemes may be utilized to correlate the number of fibers in the bundle to the density of the pixels in the sensor 16. Commonly a number of fiber bundles may be provided for each pixel. Other relationships may be utilized as well. The pixel information from neighboring bundled fibers may be fused together with information from neighboring pixels to record the information collected by the collecting system 12. In this way, the left and right image information may be captured simultaneously in the same sensor 16.

There are advantages to using a single sensor to capture both the left and the right image information in addition to the advantages of system compactness. Since sensors may vary from device to device, a sensor made by the exact same process conditions may be utilized to sense the left and right image information. Thus, variations due to semiconductor processing are less likely to a significant factor when sensor regions made by the same process, under the exact same conditions, are utilized to capture both left and right image information.

Alternatively, the redirectors 14a and 14b may be implemented using light pipes. Suitable light pipes may be made of fiber optic materials, gels or liquids which are effectively contained so as to transfer the light collected by the collecting system 12 separately to each imaging array field 16a and 16b. Because a light pipe system may have less definition between various strands making up a fiber bundle, the granularity of the resulting image may be better, in some embodiments, using a light pipe.

Figure 3:
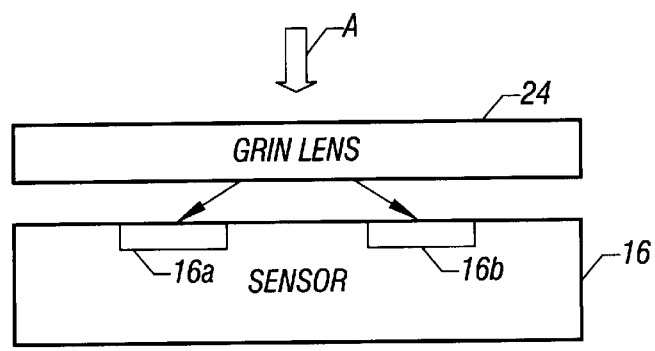
FIG. 3 is a side elevational view of a stereoscopic image sensor in accordance with another embodiment of the present invention.

In still another embodiment, shown in FIG. 3, a gradient (GRIN) index lens 24 may be utilized to create the separated images. A gradient index lens has an index of refraction that decreases as a function of the distance from the optical axis. The gradient index lens 24 may have two separate regions which separately collect the image information and transfer that information, as indicated by the arrows, to the fields 16a and 16b of the sensor 16. A wide variety of gradient index lenses are known to those skilled in the art.

Alternatively, instead of using a gradient index lens essentially the same effect may be encoded into a suitable holographic recording medium. A holographic phase plate may be formed in a fashion to create the desired lens characteristics. For example, a plane wave and a spherical wave may be used to form the hologram to create the effect of each spherical lens 12a and 12b. An object wave (O(x,y)) and a reference wave (R(x,y)) may be combined to record a hologram. The interference pattern "H" that is recorded with the object wave and the reference wave is given by the following equation (where "*" means "conjugate")

$$H=|O+R|^2=|O|^2+|R|^2+OR^*+O^*R$$

Figure 4A:
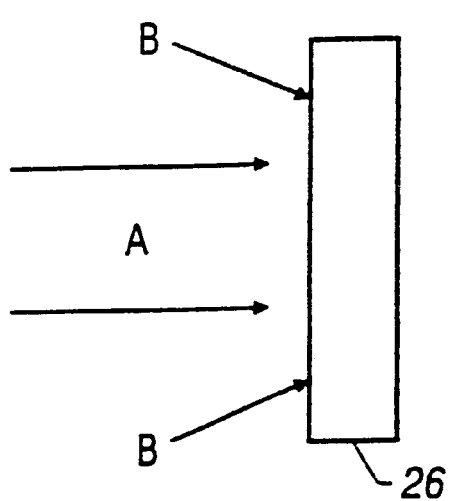
FIGS. 4A and 4B show the formation of a holographic plate.

The diffraction information is contained in the last two terms of the above equation. Referring to FIG. 4a, the reference wave is indicated as A and the object wave which may be a spherical wave front, is indicated as B, each of which intersects at the master 26.

During reconstruction, when the hologram is illuminated with the reference wave again, the original object wave is recreated as indicated in the following equation:

$$H^*R=|O+R|^{2*}R=R|O|^2+R|R|^2+O|R|^2+O^*R^2$$

Figure 4B:
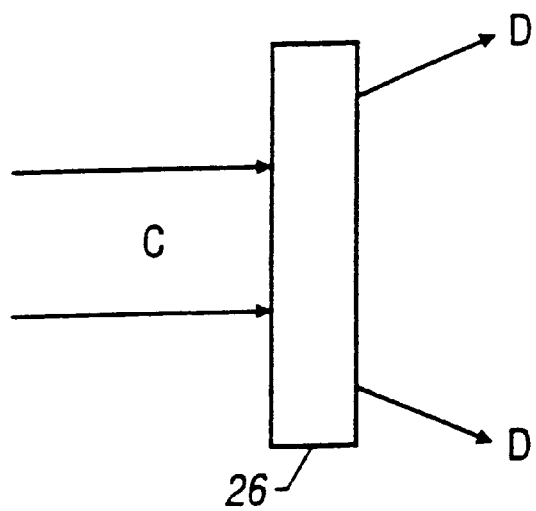

Referring to FIG. 4B, the reference wave is indicated as C and reconstructed object wave as indicated as D, extended from the master 26.

If R=1, the original object wave O is recovered from the third term in the equation set forth above. For this application, the hologram may be a volume phase hologram. This effectively suppresses the other terms which would otherwise result in wasted light output. As a result, substantially all the light output may be directed into the third term of the equation above, which is the area of interest here.

Recording the hologram may be done using coherent light. However, the reconstruction may be accomplished with broadband light sources. The desired wavelength selectivity may be no different than the corresponding physical structure. Therefore, the light efficiency may not be altered substantially. The optical master produced in this way may then be used to mass produce holographic lenses using conventional techniques. If desired, relatively low cost holographic lenses may be produced in volume, which may be easily secured two lenses over a substrate.

The holographic plate may record the desired optical effect which is comparable to that achieved by the system shown in FIG. 1. That is, the holographic plate may separately collect two spatially displaced versions of the object image and refract them in a way that they expose a more closely separated imaging array field 16a and 16b.

With embodiments of the present invention, a single sensor may record a pair of stereoscopic images for subsequent three dimensional display. In addition to advantages in terms of compactness and lower processing complexity, the system may be advantageous since each image is captured by imaging fields which, to the greatest possible extent, are identical to one another. The resulting images may then be displayed using known techniques for three dimensional displays.

For example, left and right image pairs may be electronically recombined in the three dimensional image rendering and display system 22. The three dimensional image information from the stereoscopic pairs may be combined in a coded composite. The image information from each pair and the depth information arising from the distance between the collectors 12a and 12b may be encoded in a extractable form such as a color or polarization coding. When viewed using a suitably polarized viewer or a suitably colored filter, the user experiences three dimensions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A stereoscopic image sensor comprising:
   an imaging array die including a left and a right imaging array field, said fields being spaced substantially apart; and
   a stereoscopic lens system including left and right image collectors, said image collectors being spaced further apart than said left and right imaging array fields.

2. The sensor of claim 1 wherein said collectors include a pair of spherical lenses displaced apart by a distance greater than the distance between said left and right imaging array fields.

3. The sensor of claim 2 including an image redirector which redirects image information from said collectors to said imaging array fields.

4. The sensor of claim 3 wherein said redirector includes a pair of fiber bundles.

5. The sensor of claim 3 wherein said redirector includes a pair of light pipes.

6. The system of claim 3 wherein said redirector includes a gradient index lens.

7. The sensor of claim 3 wherein said redirector includes a holographic plate.

8. The sensor of claim 4 wherein said fiber bundles are rectangular in cross-section.

9. The sensor of claim 4 wherein the cross-sectional shape of the fiber bundles matches the shape of the imaging array fields.

10. A method of capturing left and right stereoscopic image information comprising:

collecting image information from a pair of spaced apart image collectors;

redirecting the collected image information to a single digital sensor including left and a right array fields on the same die, said fields being spaced substantially apart; and capturing separate left and right image information in the single digital sensor.

11. The method of claim 10 wherein redirecting includes transferring light through a fiber bundle.

12. The method of claim 10 further including positioning said collectors spaced apart from one another by a distance greater than the left and right array fields are separated.

13. The method of claim 10 including using a light pipe to redirect the collected image information.

14. The method of claim 10 including using a gradient index lens to redirect the collected image information.

15. The method of claim 10 including using fiber bundles to redirect said image information and arranging the ends of said bundles in alignment with said array fields.

16. A stereoscopic imaging system comprising:

a single imaging sensor die including a left and a right imaging array field defined on said die, said fields being spaced substantially apart;

a stereoscopic lens system including left and right image collectors; and a redirector to redirect the information collected by said image collectors and transmit it to said imaging array fields.

17. The system of claim 16 wherein said collectors are spaced apart further than said left and right imaging array fields.

18. The system of claim 16 wherein said redirector includes a fiber bundle.

19. The system of claim 16 wherein said redirector is a light pipe.

20. The system of claim 16 wherein said collectors are spherical lenses.

21. The system of claim 16 wherein said collectors use a gradient index lens.

22. The system of claim 16 wherein said collectors are a holographic plate.

* * * * *